United States Patent [19]

Schoemer

[11] 4,291,475
[45] Sep. 29, 1981

[54] LABELLING DEVICE
[75] Inventor: Hans L. Schoemer, Schaumburg, Ill.
[73] Assignee: Motorola, Inc., Schaumburg, Ill.
[21] Appl. No.: 147,796
[22] Filed: May 8, 1980

Related U.S. Application Data

[63] Continuation of Ser. No. 4,251, Jan. 18, 1979, abandoned, which is a continuation of Ser. No. 799,053, May 20, 1977, abandoned.

[51] Int. Cl.³ .............................................. G09F 3/20
[52] U.S. Cl. .................................... 40/338; 40/10 D; 179/179
[58] Field of Search ................ 40/336, 337, 338, 339, 40/10 R, 10 D, 152, 159; 179/100, 178

[56]  References Cited
U.S. PATENT DOCUMENTS

| | | | |
|---|---|---|---|
| 2,488,516 | 11/1949 | Shore | 40/336 |
| 3,553,875 | 1/1971 | Hicks | 40/336 |
| 3,627,930 | 12/1971 | Tolman | 179/100 R |
| 3,807,074 | 4/1974 | Owens et al. | 40/159 |
| 3,838,229 | 9/1974 | Morrell et al. | 179/179 X |
| 3,941,951 | 3/1976 | Engstrom et al. | 179/179 |
| 3,970,397 | 7/1976 | Armstrong | 40/360 |
| 4,026,033 | 5/1977 | Martin | 40/336 |
| 4,033,651 | 5/1977 | England | 179/100 R |

*Primary Examiner*—John F. Pitrelli
*Assistant Examiner*—G. Lee Skillington
*Attorney, Agent, or Firm*—Rolland R. Hackbart; James W. Gillman

[57]  ABSTRACT

A device for labelling a telephone set or the like. A flexible transparent shield covers a paper label in a receiving area in the handset housing of a telephone set. Lips at the opening of a pair of notches disposed in tangs in the transparent shield wrap around posts in the housing to retain the transparent shield and paper label in the receiving area of the housing.

3 Claims, 5 Drawing Figures

U.S. Patent  Sep. 29, 1981  4,291,475
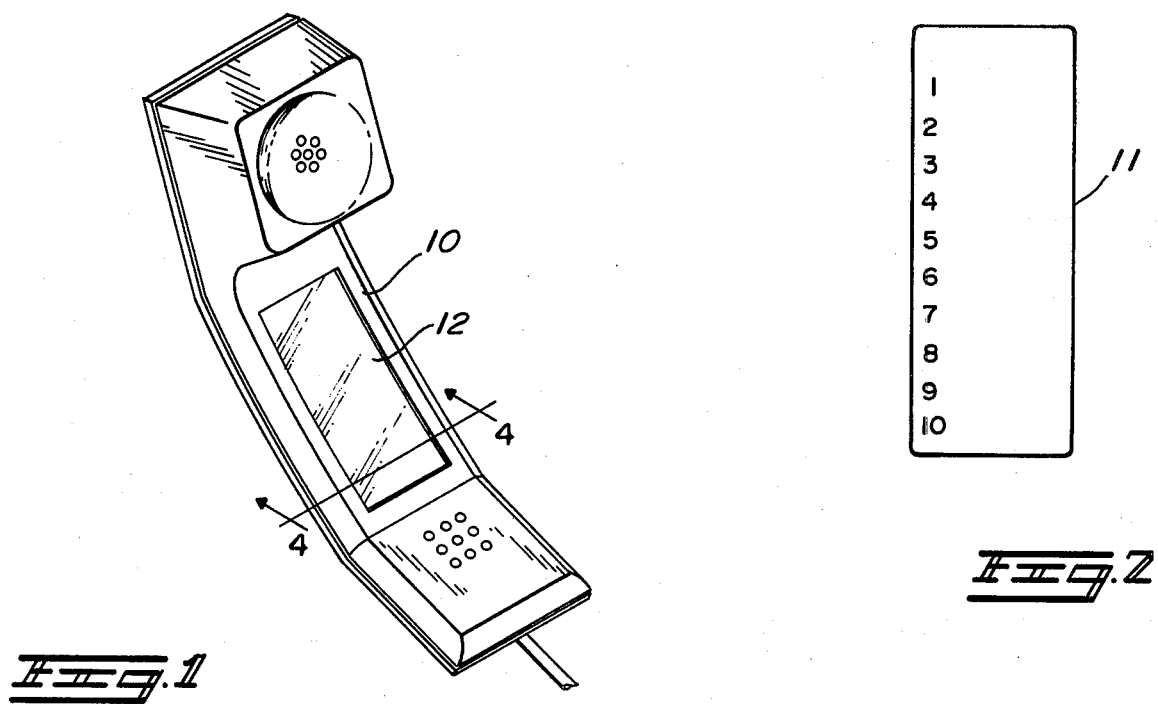
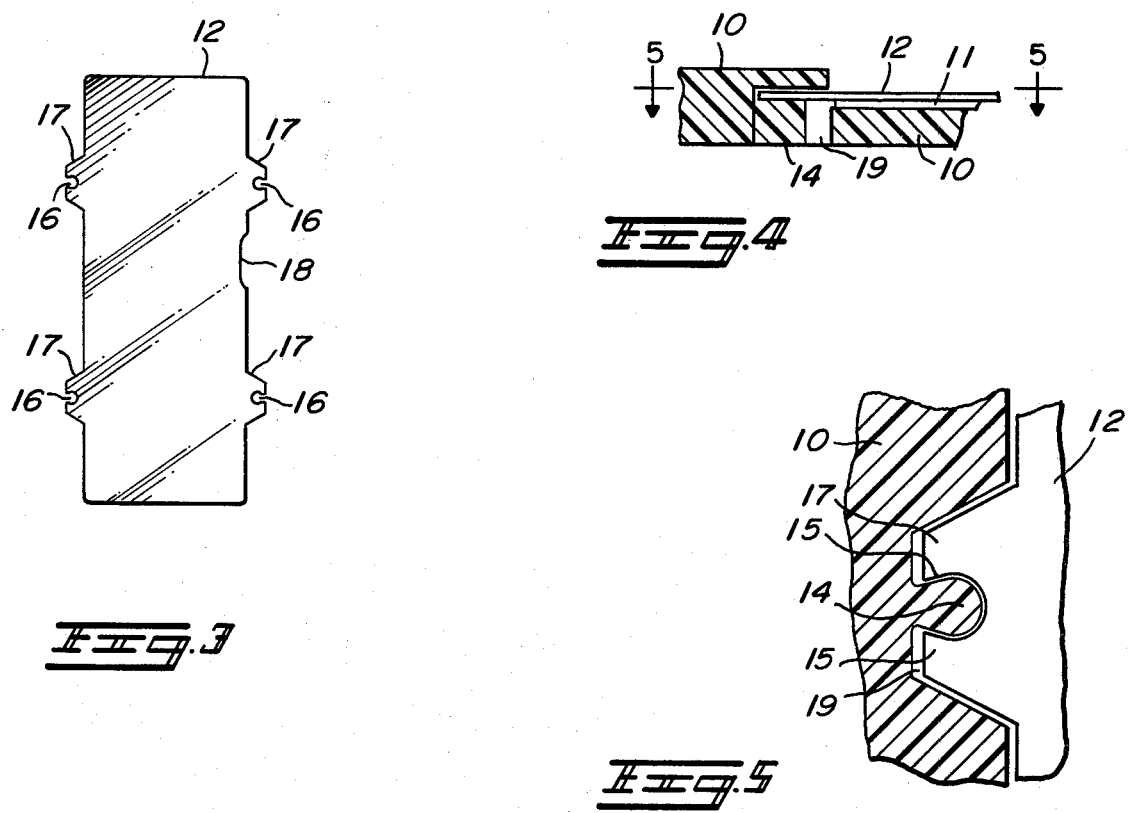

LABELLING DEVICE

This is a continuation of application Ser. No. 004,251, filed Jan. 18, 1979, now abandoned, which was a continuation of Ser. No. 799,053 filed May 20, 1977, now abandoned.

BACKGROUND OF THE INVENTION

1. Field of the Invention

The present invention relates to a labelling device and more particularly, to an improved labelling device.

2. Description of the Prior Art

Prior art labelling devices ar typified by a labelling device for a telephone set which is located in the cradle or handset near the dial. A paper label with the telephone number for a particular telephone set is retained by a transparent shield which covers the paper label when inserted into slots in the cradle or handset of the set. The transparent shield is made of relatively thick inflexible, plastic shaped for insertion into the slots in the telephone set. The inflexibility of the thick plastic shield prevents the shield from falling out of the slots during normal usage. However, a relatively large thick shield would require a large amount of force for insertion and removal due to the relative inflexibility of the thick plastic. In addition, a large thin shield would fall out during normal usage if retained only by slots.

For the foregoing and other shortcomings and problems, there has been a long felt need for an improved labelling device.

SUMMARY OF THE INVENTION

Accordingly, it is an object of the present invention to provide an improved labelling device.

It is a further object of the present invention to provide an improved labelling device that is both easily removable and reliably retained during normal usage.

In accordance with the present invention, the aforementioned problems and shortcomings of the prior art are overcome and the aforementioned and other objects are attained by an improved labelling device.

According to the present invention, a device for labelling a base member, such as the handset or cradle of a telephone set, is provided. A receiving area is defined in the base member by at least a pair of posts which are spaced apart to receive a flexible element or label therebetween. The relatively flexible element has at least a pair of tangs which each have a notch and a pair of lips. The lips define a narrow opening to the notch which is wider therewithin. To label the base member, the flexible element is inserted into the receiving area and retained by the lips of the tongs which wrap around corresponding posts disposed in respective notches of the tangs. A relatively thin and large flexible element is reliably retained in the base member by the lips of the tangs. The flexible element can also be transparent so that a paper label, much longer than prior art labels, can be retained thereunder. The transparent element both retains the paper label and shields it from the environment. A relatively large paper label can provide a directory of a plurality of telephone numbers and can be readily updated or changed since the flexible element is easily removed and subsequently re-inserted.

Additional features, objects and advantages of the labelling device in accordance with the present invention will be more clearly apprehended from the following detailed description together with the accompanying drawings.

BRIEF DESCRIPTION OF THE DRAWINGS

FIG. 1 shows a labelling device in accordance with the present invention disposed in the handset of a telephone set.

FIG. 2 shows a paper label which provides for a directory of up to ten telephone numbers.

FIG. 3 shows a flexible shield which covers the paper label of FIG. 2 when both are inserted into the receiving area of the handset in FIG. 1.

FIG. 4 is a fragmentary section taken substantially along the line 4—4 of FIG. 1.

FIG. 5 is a fragmentary section taken substantially along the line 5—5 of FIG. 4.

DESCRIPTION OF THE PREFERRED EMBODIMENT

Referring now to FIG. 1, a labelling device in accordance with the present invention is shown disposed on the underside of the handset 10 of a telephone set. The transparent element or shield 12 is used to retain a paper label 11 in a slightly recessed receiving area of the handset 10. The paper label 11 is large enough to provide for a directory of a given number of telephone numbers, for example ten (see FIG. 2). Paper labels of the prior art are much smaller and have enough space at most for two telephone numbers. The transparent shield 12 not only retains but also protects the paper label 11 from the environment. Since the transparent shield 12 can be easily removed, the paper label 11 can be conveniently updated and changed. Although the labelling device is shown in the preferred embodiment of a telephone set, the present invention has a broader applicability that can be advantageously utilized in many applications.

In the preferred embodiment, the transparent shield 12 as shown in FIG. 3 is utilized to retain a paper label 11 as shown in FIG. 2. The shield 12 need not be transparent and, in other embodiments, can be labelled itself or capable of being labelled by suitable means. Referring to FIG. 3, the transparent shield 12 contains at least a pair of tangs 17 which each have a notch 16 and a pair of lips defining a narrow groove to the notch 16 which is wider therewithin. In the preferred embodiment, four tangs 17 are used to retain a relatively large paper label 11. The transparent shield 12 also contains an additional notch or slot 18 which is accessible when the transparent shield 12 is inserted in the handset to assist in removing the shield 12. The transparent shield 12 is made of a flexible material, for example, clear polyester plastic. Since the transparent shield 12 is retained by the notches 16 and the lips which partially wrap around respective posts in the handset housing, the transparent shield 12 can be reasonably thin, for example, a thickness of 0.01 inches. Two or more tangs 17 with the notches 16 and the lips 15 (see FIG. 5) are provided in the transparent shield 12. The transparent shield 12 with a label 11 thereunder is inserted into the receiving area of the handset housing 10 so that the lips 15 of the tangs 17 wrap around corresponding posts disposed in respective notches 16 of the tangs 17.

The retention of the transparent shield together with the paper label in the handset housing can be better apprehended by referring to FIG. 4, which is a fragmentary section of the handset housing of FIG. 1 taken along the line 4—4. The shield 12 is placed over the directory 11 in the receiving area of the housing 10 so that the tangs 17 are inserted into slots 19 in the handset housing 10, and the lips 15 of the tangs 17 wrap around corresponding posts 14 disposed in respective notches 16 of the tangs 17. FIG. 5, which is a fragmentary section along the lines 5—5 of FIG. 4 further illustrates the foregoing. The posts 14 of the handset housing 10 are substantially circular in circumference and are disposed in slots 19 in the handset housing 10. Notches 16 in the transparent shield 12 are correspondingly circular thereby defining lips 15. When the transparent shield 12 is inserted, the lips 15 of the tangs 17 are deflected to the sides and partially wrap around posts 14 hereby retaining the transparent shield 12. The tangs 17 (se FIG. 3) reside in slots 19 in the handset housing 10 when the transparent shield 12 is fully inserted.

In the preferred embodiment, the transparent shield 12 has been shown with four tangs 17 with notches 16 and lips 15. Other embodiments can be devised without departing from the spirit and scope of the present invention. For example, the transparent shield 12 need only have one tang 17 with a notch 16 and lips 15. The transparent shield 12 is then retained by inserting a first edge into a slot in the housing and partially wrapping the lips 15 of the tang 17 around a post disposed at the opposite side.

The foregoing embodiments have been intended as illustrations of the principles of the present invention. Accordingly, other modifications, uses and embodiments can be devised by those skilled in the art without departing from the spirit and scope of the principles of the present invention.

What is claimed is:

1. A device for providing an alterable directory of telephone numbers for a telephone set having a handset, said device disposed on the underside of the handset of the telephone set, said directory device comprising:

said handset including a recessed area on the underside surface thereof, said recessed area having at least a pair of slots each including a circular post and spatially disposed on opposite sides of the recessed area;

a directory label insertable into the recessed area of the handset for providing an alterable directory of at least two telephone numbers thereupon; and a flexible, transparent shield, having a thickness of at most 0.01 inches, insertable into the recessed area for covering and retaining the directory label, said shield having at least a pair of tangs, each tang having a notch with a pair of lips, the lips of each notch defining a narrow opening to the respective notch which is wider therewithin, said shield fixedly retained in the recessed area of the handset by the notches of the tangs which each insert into corresponding slots where the respective notch engages the post therewithin, the lips of each notch partially wrapping around the corresponding post for retaining the transparent shield and directory label within the recessed area.

2. The directory device according to claim 1, wherein said shield further includes a slot for facilitating removal of the shield and directory, the slot spatially disposed at a predetermined position along the edge of the shield in order to be accessible when said shield is retained.

3. The directory device according to claim 1 or 2, wherein the directory label provides for an alterable directory of at least ten telephone numbers.

* * * * *

UNITED STATES PATENT AND TRADEMARK OFFICE
CERTIFICATE OF CORRECTION

PATENT NO. : 4,291,475
DATED : September 29, 1981
INVENTOR(S) : HANS L. SCHOEMER It is certified that error appears in the above—identified patent and that said Letters Patent is hereby corrected as shown below:

Column 3, line 13 delete "hereby" and insert --thereby--

Column 3, line 14, delete "se" and insert

--see--

Signed and Sealed this

Twenty-third Day of March 1982

[SEAL]

Attest:

Attesting Officer

GERALD J. MOSSINGHOFF

Commissioner of Patents and Trademarks